United States Patent
Matsuyama

(10) Patent No.: US 9,789,364 B2
(45) Date of Patent: Oct. 17, 2017

(54) GOLF BALL

(71) Applicant: Dunlop Sports Co. Ltd., Kobe-shi, Hyogo (JP)

(72) Inventor: Yoshiko Matsuyama, Kobe (JP)

(73) Assignee: DUNLOP SPORTS CO. LTD., Kobe-shi, Hyogo (JP)

( * ) Notice: Subject to any disclaimer, the term of this patent is extended or adjusted under 35 U.S.C. 154(b) by 125 days.

(21) Appl. No.: 14/979,929

(22) Filed: Dec. 28, 2015

(65) Prior Publication Data

US 2016/0184649 A1  Jun. 30, 2016

(30) Foreign Application Priority Data

Dec. 26, 2014  (JP) ................. 2014-266654

(51) Int. Cl.
| | |
|---|---|
| *A63B 37/00* | (2006.01) |
| *A63B 43/00* | (2006.01) |
| *C09D 5/22* | (2006.01) |
| *A63B 45/02* | (2006.01) |

(52) U.S. Cl.
CPC ........ *A63B 37/0022* (2013.01); *A63B 43/008* (2013.01); *A63B 45/02* (2013.01); *C09D 5/22* (2013.01)

(58) Field of Classification Search
None
See application file for complete search history.

(56) References Cited

U.S. PATENT DOCUMENTS

| | | | | |
|---|---|---|---|---|
| 5,156,405 A | * | 10/1992 | Kitaoh | .................. A63B 37/12 |
| | | | | 273/DIG. 22 |
| 5,494,291 A | * | 2/1996 | Kennedy | ................. C08K 5/20 |
| | | | | 273/DIG. 24 |
| 6,716,116 B1 | | 4/2004 | Yokota | |
| 2002/0077197 A1 | | 6/2002 | Endo | |
| 2006/0172135 A1 | * | 8/2006 | Agrawal | ................. B05D 5/06 |
| | | | | 428/411.1 |

FOREIGN PATENT DOCUMENTS

| | | |
|---|---|---|
| JP | 4-122372 A | 4/1992 |
| JP | 6-54931 A | 3/1994 |
| JP | 2001-17576 A | 1/2001 |
| JP | 2002-126132 A | 5/2002 |

OTHER PUBLICATIONS

Kirk Othmer Encyclopedia of Chemical Technology; "Fluorescent Whitening Agents"; (no date) pp. 1-14.*

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball showing both striking a good balance between the visibility and the weather resistance. The present invention provides a golf ball comprising a golf ball body and two or more paint film layers formed on a surface of the golf ball body, wherein the paint film layers comprises a first paint film layer containing an inorganic fluorescent agent but substantially not containing an ultraviolet absorber, and a second paint film layer containing an ultraviolet absorber but substantially not containing an inorganic fluorescent agent; and the second paint film layer is disposed inside the first paint film layer.

19 Claims, 1 Drawing Sheet

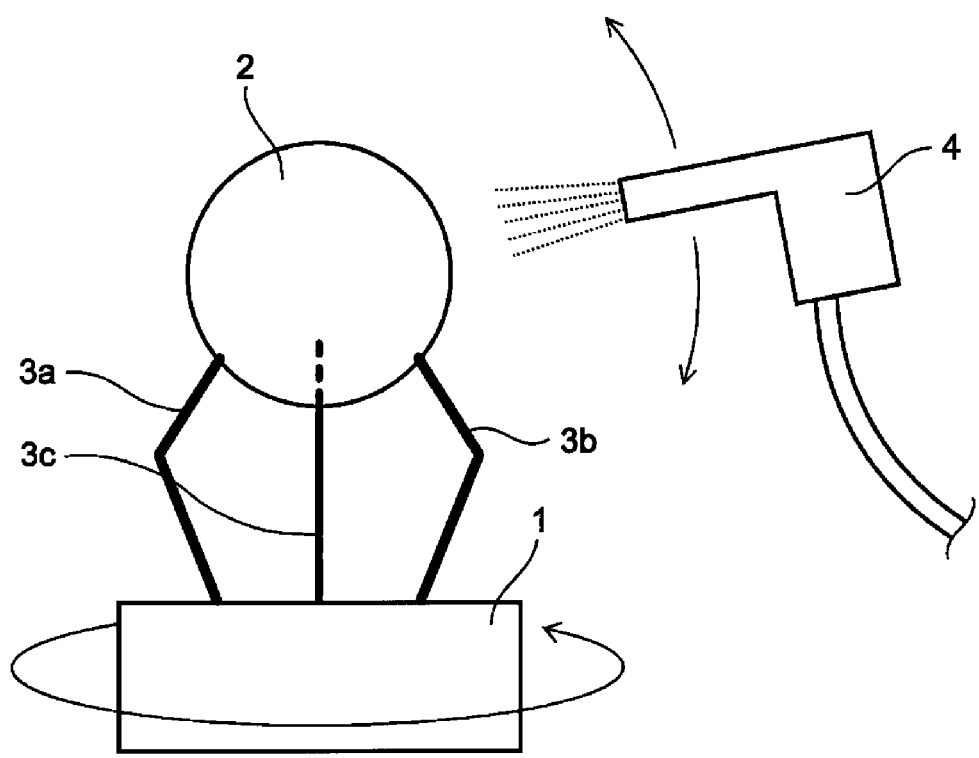

GOLF BALL

FIELD OF THE INVENTION

The present invention relates to a painted golf ball, specifically an improvement technology of a paint film of a golf ball.

DESCRIPTION OF THE RELATED ART

A paint film is usually formed on the surface of a golf ball body for the purpose of imparting gloss to improve appearance of the golf ball, or for the purpose of protecting the mark or the golf ball body.

It is known that the visibility of the golf ball can be enhanced by blending an inorganic fluorescent agent or the like in the paint film. For example, Japanese Patent Publication No. H06-54931 A discloses a golf ball covered with a paint having a luminescing action. Japanese Patent Publication No. H04-122372 A discloses a luminous golf ball obtained by applying or mounting a light cumulative, fluorescent or spontaneously luminous substance thereon.

For example, Japanese Patent Publication No. 2002-126132 A discloses a painted golf ball comprising a ball body, and at least one colorless and transparent paint layer covering the surface of the ball body, wherein the surface layer of the ball body contains a white pigment but substantially does not contain an fluorescent brightener and an ultraviolet absorber, and the paint layer contains a fluorescent brightener and an ultraviolet absorber. Japanese Patent Publication No. 2001-17576 A discloses a one piece golf ball comprising a ball body formed from a rubber composition containing a base rubber, an $\alpha,\beta$-unsaturated carboxylic acid and/or a metal salt thereof, and an organic peroxide, and a clear coat applied on the surface of the ball body, wherein the rubber composition is a white rubber composition containing 0.5 part by mass to 5 parts by mass of titanium oxide and 0.001 part by mass to 0.1 part by mass of a blue pigment with respect to 100 parts by mass of the base rubber; and the clear coat contains 0.02 part by mass to 0.5 part by mass of a fluorescent brightener and 0.05 part by mass to 3 parts by mass of an ultraviolet absorber with respect to 100 parts by mass of a resin component.

SUMMARY OF THE INVENTION

The golf ball comprising a paint film only having a fluorescence material blended therein, such as the golf balls disclosed in Japanese Patent Publication No. H06-54931 A and No. H04-122372 A, shows a low weather resistance. In addition, like the golf balls disclosed in Japanese Patent Publication No. 2002-126132 A and No. 2001-17576 A, if a fluorescent brightener is blended in the paint film together with an ultraviolet absorber, ultraviolet light is absorbed by the ultraviolet absorber, and thus the fluorescent brightener does not luminesce. As a result, the golf ball comprising a paint film having a fluorescent brightener and an ultraviolet absorber blended therein shows a small visibility improvement effect.

The present invention has been achieved in view of the above circumstances. An object of the present invention is to provide a golf ball striking a good balance between the visibility and the weather resistance.

The golf ball according to the present invention that has solved the above problems comprises a golf ball body and two or more paint film layers formed on a surface of the golf ball body, wherein the paint film layers comprises a first paint film layer containing an inorganic fluorescent agent but substantially not containing an ultraviolet absorber, and a second paint film layer containing an ultraviolet absorber but substantially not containing an inorganic fluorescent agent; and the second paint film layer is disposed inside the first paint film layer. By disposing the second paint film layer containing the ultraviolet absorber inside the first paint film layer containing the inorganic fluorescent agent, luminescence inhibition of the inorganic fluorescent agent caused by the ultraviolet absorption of the ultraviolet absorber does not occur. As a result, the inorganic fluorescent agent can efficiently fluoresce, and thus the golf ball shows an improved visibility. Further, since the second paint film layer disposed inside the first paint film layer absorbs the ultraviolet light, the golf ball shows an improved weather resistance.

According to the present invention, a golf ball striking a good balance between the visibility and the weather resistance is obtained based on the aforementioned effects.

BRIEF DESCRIPTION OF THE DRAWINGS

FIG. 1 is a schematic view illustrating an embodiment applying the paint with an air gun.

DESCRIPTION OF THE PREFERRED EMBODIMENT

The golf ball according to the present invention comprises a golf ball body and two or more paint film layers formed on a surface of the golf ball body, wherein the paint film layers comprises a first paint film layer containing an inorganic fluorescent agent but substantially not containing an ultraviolet absorber, and a second paint film layer containing an ultraviolet absorber but substantially not containing an inorganic fluorescent agent; and the second paint film layer is disposed inside the first paint film layer.

In the golf ball according to the present invention, the first paint film layer contains an inorganic fluorescent agent but substantially does not contain an ultraviolet absorber.

First, the inorganic fluorescent agent contained in the first paint film layer will be explained. The inorganic fluorescent agent is not particularly limited as long as it fluoresces by absorbing ultraviolet light. The inorganic fluorescent agent preferably includes at least one selected from the group consisting of a blue fluorescent substance such as $BaMgAl_{10}O_{17}$:Eu and $(SrCaBaMg)_5(PO_4)_3Cl$:Eu, a green fluorescent substance such as $Zn_2SiO_4$:Mn, $BaMg_2Al_{16}O_{27}$:Eu, $BaMg_2Al_{16}O_{27}$:Eu/Mn, $BaMg_2Al_{16}O_{27}$:Mn, $LaPO_4$:Ce, $LaPO_4$:Tb and $LaPO_4$:Ce/Tb; a yellow fluorescent substance such as $Y_3Al_5O_{12}$:Ce and $Y_2O_2S$:Eu, and a red fluorescent substance such as $Ca_{10}(PO_4)_6FCl$:Sb/Mn, $Ca_{10}(PO_4)_6FCl$:Sb, $Ca_{10}(PO_4)_6FCl$:Mn and $Y_2O_3$:Eu. These fluorescent substances may be used solely, or two or more fluorescent substances may be used in combination.

The content of the inorganic fluorescent agent in the first paint film layer is preferably 1 part by mass or more, more preferably 2 parts by mass or more, and even more preferably 3 parts by mass or more, and is preferably 25 parts by mass or less, more preferably 24 parts by mass or less, and even more preferably 23 parts by mass or less, with respect to 100 parts by mass of the base resin constituting the first paint film layer. If the content of the inorganic fluorescent agent in the first paint film layer is 1 part by mass or more, the fluorescence intensity is high, and thus a golf ball showing an excellent visibility is easily obtained. Further, if the content of the inorganic fluorescent agent in the first paint film layer is 25 parts by mass or less, a paint film showing better properties is obtained without increasing costs.

The volume average particle diameter of the inorganic fluorescent agent is preferably 1.0 µm or more, more preferably 1.5 µm or more, even more preferably 2.0 µm or more, and particularly preferably 4.0 µm or more, and is preferably 10.0 µm or less, more preferably 9.0 µm or less, and even more preferably 8.0 µm or less. If the volume average particle diameter of the inorganic fluorescent agent falls within the above range, the dispersibility of the inorganic fluorescent agent in the paint film increases, and thus the obtained golf ball shows further enhanced visibility. The volume average particle diameter can be measured with a laser diffraction/scattering type particle size distribution measuring apparatus.

In order to allow the inorganic fluorescent agent in the first paint film layer to efficiently fluoresce by absorbing ultraviolet light, it is preferred that the first paint film layer substantially does not contain an ultraviolet absorber. This is because the ultraviolet absorber may absorb the excitation light necessary for the inorganic fluorescent agent to fluoresce.

In the golf ball according to the present invention, the second paint film layer contains an ultraviolet absorber but substantially does not contain an inorganic fluorescent agent.

The ultraviolet absorber is not particularly limited, and examples thereof include a salicylic acid derivate, benzophenone derivate, benzotriazole derivate, cyanoacrylate derivate, triazine derivate, and nickel complex.

Examples of the salicylic acid derivate type ultraviolet absorber include phenyl salicylate, p-t-butylphenyl salicylate, p-octylphenyl salicylate and the like. Examples of the benzophenone derivate type ultraviolet absorber include 2,4-dihydroxybenzophenone, 2-hydroxy-4-methoxybenzophenone, 2-hydroxy-4-octyloxybenzophenone, 2,2-dihydroxy-4,4'-methoxybenzophenone and the like. Examples of the benzotriazole derivate type ultraviolet absorber include 2-(2'-hydroxy-5'-methylphenyl)benzotriazole, 2-(2'-hydroxy-5'-t-butylphenyl)benzotriazole, 2-(2'-hydroxy-3'-t-butyl-5'-methylphenyl)-5-chlorobenzotriazole, 2-[2-hydroxy-3,5-bis(α,α'-dimethylbenzyl)phenyl]-2H-benzotriazole, 2-(5-methyl-2-hydroxyphenyl)benzotriazole and the like. Examples of the cyanoacrylate derivate type ultraviolet absorber include 2-ethylhexyl-2-cyano-3,3'-diphenyl acrylate, ethyl-2-cyano-3,3'-diphenyl acrylate and the like. Examples of the triazine derivate type ultraviolet absorber include 2-(4,6-diphenyl-1,3,5-triazine-2-yl)-5-[(hexyl)oxy]-phenol, 2,4-bis(2-hydroxy-4-butyloxyphenyl)-6-(2,4-bis-butyloxyphenyl)-1,3,5-triazine, 2-(4-{[2-hydroxy-3-(2'-ethyphexyl]oxy}-2-hydroxyphenyl)-4,6-bis(2,4-dimethylphenyl)-1,3,5-triazine and the like. Specific examples include "Sumisoap 130" and "Sumisoap 140" (benzophenone based ultraviolet absorber) manufactured by Sumitomo Chemical Co., Ltd.; "TINUVIN 234", "TINUVIN 900", "TINUVIN 326" and "TINUVIN P" (benzotriazole based ultraviolet absorber) manufactured by Ciba Specialty Chemicals plc.; "Uvinul N-35" (cyanoacrylate based ultraviolet absorber) manufactured by BASF Corporation; "TINUVIN 1577", "TINUVIN 460" and "TINUVIN 405" (triazine based ultraviolet absorber) manufactured by Ciba Specialty Chemicals plc.; and the like. These ultraviolet absorbers may be used solely, or two or more of these ultraviolet absorbers may be used in combination. Further, the ultraviolet absorber for use in the present invention is not limited to the aforementioned ultraviolet absorbers, any conventionally known ultraviolet absorber may be used.

The content of the ultraviolet absorber in the second paint film layer is preferably 0.2 part by mass or more, more preferably 0.3 part by mass or more, and even more preferably 0.5 part by mass or more, and is preferably 3.5 parts by mass or less, more preferably 1.0 part by mass or less, even more preferably 0.8 part by mass or less, and particularly preferably 0.6 part by mass or less, with respect to 100 parts by mass of the base resin constituting the second paint film layer. If the content of the ultraviolet absorber in the second paint film layer is 0.2 part by mass or more, the ultraviolet absorption effect is enhanced, and thus a golf ball showing an excellent weather resistance is easily obtained. Further, if the content of the ultraviolet absorber in the second paint film layer is 3.5 parts by mass or less, a paint film showing better properties is obtained without increasing costs.

The base resin constituting each of the paint films is not particularly limited, and an acrylic resin, epoxy resin, polyurethane, polyester, cellulose based resin or the like can be employed. A polyurethane obtained by a reaction between a polyol component and a polyisocyanate component is preferred. This is because if the polyurethane is employed, a paint film showing further enhanced impact resistance can be obtained. It is noted that the base resin constituting each of the paint films may be identical or different from each other.

As the polyisocyanate component constituting the polyurethane, a compound having at least two isocyanate groups can be used. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and para-phenylene diisocyanate (PPDI); an alicyclic polyisocyanate or aliphatic polyisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI); and derivatives of these polyisocyanates. These polyisocyanates may be used solely or as a mixture of at least two of them.

The content of the isocyanate group (NCO %) in the polyisocyanate component is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the content of the isocyanate group (NCO %) in the polyisocyanate component can be defined by the following expression.

NCO(%)=100×[mole number of isocyanate groups in polyisocyanate component×42(molecular weight of NCO)]/[total mass (g) of polyisocyanate component]

Examples of the polyol component constituting the polyurethane include a low molecular weight polyol having a molecular weight of less than 500, and a high molecular weight polyol having an average molecular weight of 500 or more. Examples of the low molecular weight polyol component include a diol such as ethylene glycol, diethylene glycol, triethylene glycol, 1,4-butanediol, neopentyl glycol, and 1,6-hexanediol; and a triol such as glycerin, trimethylolpropane, and hexanetriol. Examples of the high molecular weight polyol component include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (FNMA); a lactone polyester polyol such as poly-$\epsilon$-caprolactone (PCL), a polycarbonate polyol such as polyhexamethylene carbonate; a urethane polyol; and an acrylic polyol. These polyol components may be used solely or as a mixture of at least two of them.

The urethane polyol is a compound having a plurality of urethane bonds in its molecule, and having at least two hydroxyl groups in one molecule thereof. Examples of the urethane polyol include a urethane prepolymer obtained by a reaction between a polyol component and a polyisocyanate component, under a condition that the amount of the hydroxyl groups in the polyol component is excessive to the amount of the isocyanate groups in the polyisocyanate component. Examples of the polyol component and the polyisocyanate component constituting the urethane polyol include the polyol component and the polyisocyanate component constituting the aforementioned polyurethane.

The acrylic polyol is an acrylic resin or acrylic polymer having a plurality of hydroxyl groups within its molecule, and can be obtained, for example, by copolymerizing a (meth)acrylic monomer having a hydroxyl group and a (meth)acrylic monomer having no hydroxyl group.

Examples of the (meth)acrylic monomer having a hydroxyl group include a (meth)acrylic acid ester having a hydroxyl group such as 2-hydroxyethyl (meth)acrylate, 2-hydroxypropyl (meth)acrylate, 2-hydroxybutyl (meth)acrylate, alkyleneglycol mono(meth)acrylate, and polyalkyleneglycol mono(meth)acrylate. These (meth)acrylic monomers having a hydroxyl group may be used solely, or two or more of them may be used in combination.

Examples of the (meth)acrylic monomer having no hydroxyl group include a (meth)acrylic unsaturated carboxylic acid such as (meth)acrylic acid; a (meth)acrylic acid ester such as methyl(meth)acrylate, ethyl(meth)acrylate, propyl (meth)acrylate, isopropyl(meth)acrylate, butyl(meth)acrylate, isobutyl(meth)acrylate, pentyl(meth)acrylate, hexyl(meth)acrylate, 2-ethylhexyl(meth)acrylate, cyclohexyl (meth)acrylate, octyl(meth)acrylate, and decyl(meth)acrylate; and other (meth)acrylic monomer such as (meth)acrylonitrile, and (meth)acrylamide. These (meth)acrylic monomers having no hydroxyl group may be used solely, or two or more of them may be used in combination. It is noted that "(meth)acrylic" means "acrylic" and/or "methacrylic" in the present invention.

Additionally, the acrylic polyol may further include another monomer component having a hydroxyl group and/or another monomer component having no hydroxyl group, in addition to the (meth)acrylic monomer. Examples of another monomer component having a hydroxyl group include an unsaturated alcohol such as 3-methyl-3-butene-1-ol, 3-methyl-2-butene-1-ol, 2-methyl-3-butene-2-ol, 2-methyl-2-butene-1-ol, 2-methyl-3-butene-1-ol, and allyl alcohol. Examples of another monomer component having no hydroxyl group include an aromatic vinyl compound such as styrene and $\alpha$-methyl styrene; and an ethylenically unsaturated carboxylic acid such as maleic acid and itaconic acid. The other monomer components may be used solely, or two or more of them may be used in combination.

The hydroxyl value of the polyol component constituting the polyurethane is preferably 10 mg KOH/g or more, more preferably 25 mg KOH/g or more, even more preferably 40 mg KOH/g or more, and most preferably 55 mg KOH/g or more, and is preferably 400 mg KOH/g or less, more preferably 300 mg KOH/g or less, even more preferably 200 mg KOH/g or less, and most preferably 100 mg KOH/g or less. If the hydroxyl value of the polyol component falls within the above range, the adhesion between the paint film and the golf ball body increases. It is noted that, in the present invention, the hydroxyl value can be measured by, for example, an acetylization method, in accordance with JIS K 1557-1.

The weight average molecular weight of the aforementioned high molecular weight polyol component is preferably 500 or more, more preferably 550 or more, and even more preferably 600 or more, and is preferably 150,000 or less, more preferably 140,000 or less, and even more preferably 130,000 or less. If the weight average molecular weight of the high molecular weight polyol component falls within the above range, water resistance and impact resistance of the paint film can be enhanced. It is noted that the weight average molecular weight of the high molecular weight polyol component can be measured, for example, by gel permeation chromatography (GPC), using polystyrene as a standard material, tetrahydrofuran as an eluate, and an organic solvent system GPC column (e.g. "Shodex (registered trademark) KF series" manufactured by Showa Denko K.K.) as a column.

In the reaction between the polyol component and the polyisocyanate component, the molar ratio (NCO group/OH group) of the isocyanate group (NCO group) of the polyisocyanate component to the hydroxyl group (OH group) of the polyol component is preferably 1.0 or more, and more preferably 1.1 or more. If the molar ratio (NCO group/OH group) is less than 1.0, the curing reaction may become insufficient. Further, if the molar ratio (NCO group/OH group) is excessively large, the amount of the isocyanate groups becomes excessive, and thus the appearance of the obtained paint film may deteriorate as well as the obtained paint film may become hard and fragile. Thus, the molar ratio (NOC group/OH group) is preferably 1.4 or less, and more preferably 1.3 or less. The reason why the appearance of the obtained paint film deteriorates if the amount of the isocyanate groups is excessive in the paint is considered that if the amount of the isocyanate groups is excessive, the moisture in air and the isocyanate group react more frequently, thereby generating a lot of carbon dioxide gas.

The paint film of the golf ball according to the present invention is preferably formed from a paint containing a polyol component and a polyisocyanate component. Examples of the paint include a so-called curing type paint such as a paint composed of a base agent containing a polyol and a curing agent containing a polyisocyanate. For the sake of convenience, the component containing the polyol and the component containing the polyisocyanate are referred to as the base agent and the curing agent, respectively. However, the base agent and the curing agent may be referred to as A agent and B agent, respectively. Alternatively, the component containing the polyol may be referred to as the curing agent, and the component containing the polyisocyanate may be referred to as the base agent. The inorganic fluorescent agent and the ultraviolet absorber used in the present invention are preferably blended in the component containing the polyol.

The curing type paint may be either a water-based paint mainly containing water as a dispersion medium or a solvent-based paint mainly containing an organic solvent as a dispersion medium. In the case of the solvent-based paint, preferable examples of the solvent include toluene, isopropyl alcohol, xylene, methyl ethyl ketone, methyl ethyl isobutyl ketone, ethylene glycol monomethyl ether, ethyl benzene, propylene glycol monomethyl ether, isobutyl alcohol, and ethyl acetate.

If necessary, the paint may further contain an additive generally contained in a golf ball paint, such as an antioxidant, an anti-blocking agent, a leveling agent, a slip agent, and a viscosity modifier, in addition to the polyol component and the polyisocyanate component.

The method of applying the curing type polyurethane paint is not limited, and a conventionally known method such as a spray coating method or an electrostatic coating method can be employed.

In the case of spray coating using an air gun, the polyol component and the polyisocyanate component may be fed with respective pumps and continuously mixed with a line mixer located in the stream line just before the air gun, and the obtained mixture is subjected to spray coating. Alternatively, the polyol component and the polyisocyanate component may be subjected to spray coating separately by using an air spray system provided with a mixing ratio controlling device. The paint application may be conducted by spray coating one time or overspraying several times.

The curing type polyurethane paint applied to the golf ball body can be dried, for example, at a temperature ranging from 30° C. to 70° C. for 1 hour to 24 hours to form the paint film.

The golf ball according to the present invention is not particularly limited, as long as it comprises two or more paint film layers formed on the surface of the golf ball body, and the second paint film layer containing the ultraviolet absorber is disposed inside the first paint film layer containing the inorganic fluorescent agent. By disposing the second paint film layer containing the ultraviolet absorber inside the first paint film layer containing the inorganic fluorescent agent, luminescence inhibition of the inorganic fluorescent agent caused by the ultraviolet absorption of the ultraviolet absorber does not occur. As a result, the inorganic fluorescent agent can efficiently fluoresce, and thus the golf ball shows an improved visibility. Further, since the second paint film layer disposed inside the first paint film layer absorbs the ultraviolet light, the golf ball shows an improved weather resistance. In the present invention, the paint film layers may be three or more layers as long as the effect of the present invention is not impaired, but are preferably two layers in view of productivity. In this case, the second paint film layer containing the ultraviolet absorber is formed on the surface of the golf ball body, and the first paint film layer containing the inorganic fluorescent agent is formed on the surface of the second paint film layer.

The thickness of the first paint film layer containing the inorganic fluorescent agent is not particularly limited, and is preferably 5 μm or more, more preferably 8 μm or more, and even more preferably 10 μm or more, and is preferably 15 μm or less, more preferably 12 μm or less. If the thickness of the first paint film layer falls within the above range, discoloration of the golf ball surface can be suppressed. The thickness of the second paint film layer containing the ultraviolet absorber is not particularly limited, and is preferably 5 μm or more, more preferably 8 μm or more, and even more preferably 10 μm or more, and is preferably 15 μm or less, more preferably 12 μm or less. If the thickness of the second paint film layer falls within the above range, the inorganic fluorescent agent can luminesce without receiving the luminescence inhibition caused by the ultraviolet absorption of the ultraviolet absorber.

The total thickness of the paint film layers is not particularly limited, and is preferably 10 μm or more, more preferably 16 μm or more, even more preferably 17 μm or more, and particularly preferably 18 μm or more. If the total thickness of the paint film layers is less than 10 μm, the paint film tends to be easily wear off due to the continued use of the golf ball. Further, the total thickness of the paint film layers is preferably 25 μm or less, more preferably 24 μm or less, and even more preferably 23 μm or less. If the total thickness of the paint film layers exceeds 25 μm, the dimple effect may be lowered and thus the flying performance of the golf ball tends to be lowered. The thickness of the paint film layer can be measured, for example, by observing the cross section of the golf ball using a microscope (VHX-1000 manufactured by Keyence Corporation).

The construction of the golf ball according to the present invention is not particularly limited. The golf ball according to the present invention may be a one-piece golf ball, a golf ball (e.g. two-piece golf ball, and multi-piece golf ball having three pieces or more) comprising a core and one or more cover layer covering the core, or a wound golf ball. The present invention can be applied appropriately to any one of the above golf balls.

Next, the core used in the wound golf ball, two-piece golf ball and multi-piece golf ball, as well as the one-piece golf ball body will be explained.

The core or one-piece golf ball body may employ a conventionally known rubber composition (hereinafter, sometimes simply referred to as "core rubber composition"), and can be formed by, for example, heat-pressing a rubber composition containing a base rubber, a co-crosslinking agent, and a crosslinking initiator. The core preferably has a spherical shape.

As the base rubber, typically preferred is a high cis-polybutadiene having cis-bond in a proportion of 40 mass % or more, more preferably 70 mass % or more, and even more preferably 90 mass % or more in view of its superior resilience property. The co-crosslinking agent is preferably an α,β-unsaturated carboxylic acid having 3 to 8 carbon atoms or a metal salt thereof, and more preferably a metal salt of acrylic acid or a metal salt of methacrylic acid. The metal constituting the metal salt is preferably zinc, magnesium, calcium, aluminum or sodium, more preferably zinc. The amount of the co-crosslinking agent is preferably 20 parts by mass or more and 50 parts by mass or less with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect with 100 parts by mass of the base rubber. Further, the core rubber composition may further contain an organic sulfur compound. As the organic sulfur compound, diphenyl disulfide or a derivate thereof and thiophenol or a derivate thereof are preferably used. The amount of the organic sulfur compound is preferably 0.1 part by mass or more, more preferably 0.3 part by mass or more, and is preferably 5.0 parts by mass or less, more preferably 3.0 parts by mass or less, with respect with 100 parts by mass of the base rubber.

The core rubber composition may appropriately further contain a weight adjusting agent such as zinc oxide and barium sulfate, an antioxidant, a color powder or the like, in addition to the base rubber, the co-crosslinking agent, the crosslinking initiator, and the organic sulfur compound. The molding conditions for heat-pressing the core rubber composition should be determined appropriately depending on the formulation of the rubber composition. Generally, it is preferred that the molding is carried out by heating the core rubber composition at a temperature ranging from 130° C. to 200° C. for 10 minutes to 60 minutes, alternatively, by molding the core rubber composition in a two-step heating, i.e. heated at a temperature ranging from 130° C. to 150° C. for 20 minutes to 40 minutes, and then heated at a temperature ranging from 160° C. to 180° C. for 5 minutes to 15 minutes.

Next, the cover used for the wound golf ball, two-piece golf ball and multi-piece golf ball will be explained.

The cover may be one layer or two or more layers. In the case of two or more layers, the inner cover disposed between the core and the outermost cover is sometimes referred to as the "intermediate layer".

The cover is preferably formed from a cover composition containing a resin component. Examples of the resin component include a binary copolymer composed of an olefin and an α,β-unsaturated carboxylic acid having 3 to 8 carbon atoms (hereinafter, sometimes merely referred to as "binary copolymer"); a ternary copolymer composed of an olefin, an α,β-unsaturated carboxylic acid having 3 to 8 carbon atoms and an α,β-unsaturated carboxylic acid ester (hereinafter, sometimes merely referred to as "ternary copolymer"); an ionomer resin consisting of a metal ion-neutralized product of these binary copolymer and ternary copolymer; a thermoplastic polyurethane elastomer having a trade name of "Elastollan (registered trademark)" commercially available from BASF Japan Ltd.; a thermoplastic polyamide elastomer having a trade name of "Pebax (registered trademark)" commercially available from Arkema K.K.; a thermoplastic polyester elastomer having a trade name of "Hytrel (registered trademark)" commercially available from Du Pont-Toray Co., Ltd.; and a thermoplastic styrene elastomer having a trade name of "Rabalon (registered trademark)" commercially available from Mitsubishi Chemical Corporation.

The binary copolymer is a copolymer composed of an olefin and an α,β-unsaturated carboxylic acid having 3 to 8 carbon atoms. The ternary copolymer is a copolymer composed of an olefin, an α,β-unsaturated carboxylic acid having 3 to 8 carbon atoms and an α,β-unsaturated carboxylic acid ester. The olefin is preferably an olefin having 2 to 8 carbon atoms, and examples thereof include ethylene, propylene, butene, pentene, hexene, heptene, and octene. In particular, ethylene is preferred. Examples of the α,β-unsaturated carboxylic acid having 3 to 8 carbon atoms include acrylic acid, methacrylic acid, fumaric acid, maleic acid and crotonic acid. In particular, acrylic acid and methacrylic acid are preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferred. Among them, an ethylene-(meth)acrylic acid binary copolymer and an ethylene-(meth)acrylic acid-(meth)acrylic acid ester ternary copolymer are preferred.

Specific examples of the binary copolymer include an ethylene-methacrylic acid copolymer having a trade name of "NUCREL (registered trademark) (e.g. "NUCREL N1050H", "NUCREL N2050H", "NUCREL N1110H", "NUCREL NO200H")" commercially available from Du Pont-Mitsui Polychemicals Co. Ltd., and an ethylene-acrylic acid copolymer having a trade name of "PRIMACOR (registered trademark) 5980I" commercially available from Dow Chemical Company. In addition, specific examples of the ternary copolymer include trade name "NUCREL (registered trademark) (e.g. "NUCREL AN4318", "NUCREL AN4319")" commercially available from Du Pont-Mitsui Polychemicals Co, Ltd., trade name "NUCREL (registered trademark) (e.g. "NUCREL AE")" commercially available from E.I. du Pont de Nemours and Company, and trade name "PRIMACOR (registered trademark) (e.g. "PRIMACOR AT310", "PRIMACOR AT320")" commercially available from Dow Chemical Company. The binary copolymer and/or the ternary copolymer may be used alone, or at least two kinds of them may be used in combination.

Examples of the ionomer resin include a product obtained by neutralizing at least a part of the carboxyl groups in the binary copolymer with a metal ion, a product obtained by neutralizing at least a part of the carboxyl groups in the ternary copolymer with a metal ion, and a mixture thereof. Among them, the preferred ionomer resins are a metal ion-neutralized product of the ethylene-(meth)acrylic acid binary copolymer, and a metal ion-neutralized product of the ethylene-(meth)acrylic acid-(meth)acrylic acid ester ternary copolymer.

Specific examples of the ionomer resin include trade name of "Himilan (registered trademark) (e.g. Himilan 1555 (Na), Himilan 1557 (Zn), Himilan 1605 (Na), Himilan 1706 (Zn), Himilan 1707 (Na), Himilan AM3711 (Mg), Himilan AM7329 (Zn), and Himilan AM7337 (Na), ionomer resin of ternary copolymer: Himilan 1856 (Na) and Himilan 1855 (Zn))" commercially available from Du Pont-Mitsui Polychemicals Co, Ltd.

Further, examples of the ionomer resin include trade name "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), and Surlyn AD8546 (Li); ionomer resin of ternary copolymer: Surlyn 8120 (Na), Surlyn 8320 (Na), Surlyn 9320 (Zn), Surlyn 6320 (Mg), HPF1000 (Mg), and HPF2000 (Mg))" commercially available from E.I. du Pont de Nemours and Company.

In addition, examples of the ionomer resin commercially available from ExxonMobil Chemical Corporation include trade name "Iotek (registered trademark) (e.g. Iotek 8000 (Na), Iotek 8030 (Na), Iotek 7010 (Zn), and Iotek 7030 (Zn); ionomer resin of ternary copolymer: Iotek 7510 (Zn) and Iotek 7520 (Zn))".

It is noted that Na, Zn, Li, Mg or the like described in the parentheses after the trade name of the ionomer resin indicates a metal type of the metal ion for neutralizing the ionomer resin. The ionomer resin may be used alone or as a mixture of at least two of them.

In addition to the aforementioned resin component, the cover composition may further contain a pigment component such as a white pigment (e.g. titanium oxide), a blue pigment, a red pigment, or the like; a weight adjusting agent such as zinc oxide, calcium carbonate, barium sulfate, or the like; a dispersant; an antioxidant; an ultraviolet absorber; a light stabilizer; or the like, as long as they do not impair the performance of the cover.

When the golf ball body according to the present invention comprises at least cover layer, the outermost cover layer preferably contains a fluorescent dye and/or a fluorescent pigment. In this case, it is preferred that the fluorescent dye and/or the fluorescent pigment blended in the outermost cover layer develops a similar color as the inorganic fluorescent agent contained in the first paint film layer. This is because further enhanced visibility can be achieved due to the synergistic effect brought about by the fluorescent dye and/or the fluorescent pigment blended in the outermost cover layer and the inorganic fluorescent agent contained in the first paint film layer.

The fluorescent dye may be an organic fluorescent dye or an inorganic fluorescent dye. Further, any commercially available fluorescent dye may be used. Example of the fluorescent dye include a thioxanthene derivative, xanthene derivative, perylene derivative, peryleneimide derivative, coumarin derivative, thioindigo derivative, naphthalimide derivative, and methine derivative.

The melting point of the fluorescent dye and/or the fluorescent pigment is preferably 180° C. or less, more preferably 175° C. or less, and even more preferably 170° C. or less, and is preferably 135° C. or more, more preferably 140° C. or more, and even more preferably 145° C. or more. If the melting point of the fluorescent dye and/or the fluorescent pigment falls within the above range, mixing and dispersing the fluorescent dye and/or the fluorescent pigment in the resin component can be conducted at a relatively low temperature. As a result, discoloration caused by the high temperature in processing hardly occurs, and thus desired color tone is easily obtained.

The fluorescent dye is not particularly limited, and specific examples thereof include yellow fluorescent dyes having trade names of Lumogen F Orange™ 240 (manufactured by BASF Corporation); Lumogen F Yellow™ 083 (manufactured by BASF Corporation); Hostasol Yellow™ 3G (manufactured by Hoechst-Celanese Corporation); Oraset Yellow™ 8GF (manufactured by Ciba-Geigy Chemical Corporation); Fluorol 088™ (manufactured by BASF Corporation); Thermoplast F Yellow™ 084 (manufactured by BASF Corporation); Golden Yellow™ D-304 (manufactured by DayGlo Color Corporation); Mohawk Yellow™ D-299 (manufactured by DayGlo Color Corporation); Potomac Yellow™ D-838 (manufactured by DayGlo Color Corporation); and Polyfast Brilliant Red™ SB (manufactured by Keystone Corporation).

Examples of the fluorescent pigment include a pigment obtained by dispersing a fluorescent dye in a polymer material, and a pigment obtained by pelletizing a fluorescent dye. The fluorescent pigment is not particularly limited, and examples thereof include ZQ-11, ZQ-12, ZQ-13, ZQ-15, ZQ-16, ZQ-17-N, ZQ-18, ZQ-19, ZQ-21, GPL-11, GPL-13, GPX-14, GPL-15, GPX-17, and GPL-21 manufactured by DayGlo Color Corporation; and FZ-2000 series, FZ-5000 series, FZ-6000 series, and FZ-3040 series manufactured by SINLOIHI. Co. Ltd.

The content of the fluorescent dye and/or the fluorescent pigment in the outermost cover layer is preferably 0.5 part by mass or more, more preferably 0.6 part by mass or more, and is preferably 3.5 parts by mass or less, more preferably 3.0 parts by mass or less, with respect to 100 parts by mass of the resin component constituting the cover. If the content of the fluorescent dye and/or the fluorescent pigment is 0.5 part by mass or more, further enhanced visibility can be achieved. In addition, if the content of the fluorescent dye and/or the fluorescent pigment exceeds 3.5 parts by mass, the durability of the obtained cover may deteriorate.

It is preferred that the slab hardness of the cover composition is appropriately set in accordance with the desired performance of the golf ball. For example, in case of a so-called distance golf ball focusing on a flight distance, the cover composition preferably has a slab hardness of 50 or more, more preferably 55 or more, and preferably has a slab hardness of 80 or less, more preferably 70 or less in shore D hardness. If the cover composition has a slab hardness of 50 or more in Shore D hardness, the obtained golf ball has a high launch angle and low spin rate on driver shots and iron shots, and thus the flight distance thereof becomes great. If the cover composition has a slab hardness of 80 or less in Shore D hardness, the golf ball excellent in durability is obtained. Further, in case of a so-called spin golf ball focusing on controllability, the cover composition preferably has a slab hardness of less than 50, and preferably has a slab hardness of 20 or more, and more preferably 25 or more. If the cover composition has a slab hardness of less than 50 in Shore D hardness, the obtained golf ball readily stops on the green due to the high spin rate on approach shots. If the cover composition has a slab hardness of 20 or more in Shore D hardness, the abrasion resistance of the obtained golf ball increases. In case of a plurality of cover layers, the slab hardness of the cover composition constituting each layer can be identical or different, as long as the slab hardness of each layer falls within the above range.

The embodiment for molding the cover composition into the cover is not particularly limited, and examples thereof include an embodiment of injection molding the cover composition directly onto the core; and an embodiment of molding the cover composition into hollow shells, covering the core with a plurality of the hollow shells and subjecting to compression molding (preferably an embodiment of molding the cover composition into hollow half shells, covering the core with two half shells and subjecting to compression molding).

In the present invention, the thickness of the cover is preferably 0.3 mm or more, more preferably 0.4 mm or more, and even more preferably 0.5 mm or more, and is preferably 2.5 mm or less, more preferably 2.0 mm or less, and even more preferably 1.5 mm or less. If the thickness of the cover exceeds 2.5 mm, the resilience property of the obtained golf ball may be lowered, and if the thickness of the cover is less than 0.3 mm, it may become difficult to mold the cover.

The concave portions called dimples are usually formed on the surface of the golf ball body. The total number of the dimples formed on the golf ball body is preferably 200 or more and 500 or less. If the total number of the dimples is less than 200, the dimple effect is hardly obtained. On the other hand, if the total number of the dimples exceeds 500, the dimple effect is hardly obtained because the size of the respective dimples is small. The shape (shape in a plan view) of the formed dimples includes, for example, without limitation, a circle; a polygonal shape such as a roughly triangular shape, a roughly quadrangular shape, a roughly pentagonal shape, and a roughly hexagonal shape; and other irregular shape. The shape of the dimples may be employed solely, or two or more of the shapes may be employed in combination. The formed golf ball body is ejected from the mold, and preferably subjected to surface treatments such as deburring, cleaning and sandblast as necessary. Further, if desired, a mark may be formed thereon.

The golf ball according to the present invention preferably has a diameter ranging from 40 mm to 45 mm. In light of satisfying the regulation of US Golf Association (USGA), the diameter is particularly preferably 42.67 mm or more. In light of prevention of the air resistance, the diameter is preferably 44 mm or less, and even more preferably 42.80 mm or less. The golf ball preferably has a mass of 40 g or more and 50 g or less. In light of obtaining greater inertia, the mass is preferably 44 g or more, and more preferably 45.00 g or more. In light of satisfying the regulation of USGA, the mass is preferably 45.93 g or less.

EXAMPLES

Hereinafter, the present invention will be described in detail by way of examples. However, the present invention is not limited to the examples described below, and various changes and modifications can be made without departing from the spirit and scope of the present invention.

[Evaluation Method]

(1) Weather Resistance

The golf ball was put into a super xenon weather meter, and irradiated for 60 hours with light. Indexes L*, a* and b* in CIELAB color system of each golf ball were measured with a chromameter ("CM-3500d" manufactured by Konica Minolta, Inc.). Index differences ΔL*, Δa* and Δb* before and after light irradiation were calculated, and the color difference ΔE was calculated according to the following mathematic formula.

$$\Delta E = [(\Delta L^*)^2 + (\Delta a^*)^2 + (\Delta b^*)^2]^{1/2}$$

The weather resistance was evaluated according to the following evaluation standard.

Evaluation Standard

E (excellent): ΔE is 20 or less.

G (good): ΔE is more than 20 and less than 30.

P (poor): ΔE is 30 or more.

(2) Visibility

The golf ball was placed on a lawn, and ten golfers being at a location having a distance of 30 m from the golf ball were allowed to evaluate whether the golf ball ]was easily viewable. The visibility was evaluated according to the following evaluation standard.

Evaluation Standard

G (good): The number of the golfers evaluating that the golf ball was easily visible is five or more.

P (poor): The number of the golfers evaluating that the golf ball was easily visible is four or less.

[Production of Golf Ball]

(1) Production of Core

The core rubber composition having the formulation shown in Table 1 was kneaded, and heat-pressed in upper and lower molds, each having a semispherical cavity, at 170° C. for 20 minutes to obtain the spherical core having a diameter of 39.3 mm.

TABLE 1

| Core rubber composition | Composition I (parts by mass) |
|---|---|
| Polybutadiene rubber | 100 |
| Zinc acrylate | 35 |
| Zinc oxide | 5 |
| Barium sulfate | Appropriate amount *) |
| Diphenyl disulfide | 0.5 |
| Dicumyl peroxide | 0.8 |

*) Barium sulfate: adjustment was made such that the golf ball had a mass of 45.4 g.
Polybutadiene rubber: "BR-730 (high-cis polybutadiene)" manufactured by JSR Corporation
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Diphenyl disulfide: manufactured by Sumitomo Seika Chemicals Co., Ltd.
Dicumyl peroxide: "Percumyl (registered trademark) D" manufactured by NOF Corporation (2) Preparation of Intermediate Layer Composition and Cover Composition Materials having the formulation shown in Tables 2 and 3 were mixed with a twin-screw kneading extruder to prepare the intermediate layer composition and the cover composition in a pellet form, respectively. The extruding conditions were a screw diameter of 45 mm, a screw rotational speed of 200 rpm, and a screw L/D=35, and the mixture was heated to 200° C. to 260° C. at the die position of the extruder.

TABLE 2

| Intermediate layer composition | Composition a (parts by mass) | Composition b (parts by mass) |
|---|---|---|
| Surlyn 8945 | 55 | 55 |
| Himilan AM7329 | 45 | 45 |
| Titanium dioxide | 3 | 0.05 |
| ZQ-17 | — | 2 |

Surlyn 8945: sodium ion-neutralized ethylene-methacrylic acid copolymer ionomer resin manufactured by E. I. du Pont de Nemours and Company
Himilan AM7329: zinc ion-neutralized ethylene-methacrylic acid copolymer ionomer resin manufactured by Du Pont-Mitsui Polychemicals Co., Ltd.
ZQ-17: fluorescent pigment (yellow) manufactured by DayGlo Color Corporation.
Titanium dioxide: manufactured by Ishihara Sangyo Kaisha, Ltd.

TABLE 3

| Cover composition | Composition A (parts by mass) | Composition B (parts by mass) | Composition C (parts by mass) | Composition D (parts by mass) |
|---|---|---|---|---|
| Himilan 1555 | 10 | 10 | — | — |
| Himilan AM7329 | 55 | 55 | — | — |
| Himilan AM7337 | 5 | 5 | — | — |
| Nucrel N1050H | 30 | 30 | — | — |
| Elastollan NY85A | — | — | 100 | 100 |
| JF-90 | 0.2 | 0.2 | 0.2 | 0.2 |
| Titanium dioxide | 3 | 0.2 | 3 | 0.2 |
| ZQ-17 | — | 2.5 | — | 2.5 |
| Ultramarine blue | 0.05 | — | 0.05 | — |

Himilan 1555: sodium ion-neutralized ethylene-methacrylic acid copolymer ionomer resin manufactured by Du Pont-Mitsui Polychemicals Co., Ltd.
Himilan AM7329: zinc ion-neutralized ethylene-methacrylic acid copolymer ionomer resin manufactured by Du Pont-Mitsui Polychemicals Co., Ltd.
Himilan AM7337: sodium ion-neutralized ethylene-methacrylic acid copolymer ionomer resin manufactured by Du Pont-Mitsui Polychemicals Co., Ltd.
Nucrel N1050H: ethylene-methacrylic acid copolymer manufactured by Du Pont-Mitsui Polychemicals Co., Ltd.
Elastollan NY85A: thermoplastic polyurethane elastomer manufactured by BASF Japan Corporation
JF-90: hindered amine light stabilizer manufactured by Johoku Chemical Co., Ltd.
ZQ-17: fluorescent pigment (yellow) manufactured by DayGlo Color Corporation
Ultramarine blue: blue pigment manufactured by Holliday Pigments Company
Titanium dioxide: manufactured by Ishihara Sangyo Kaisha, Ltd.

(3) Molding of Intermediate Layer

The intermediate layer composition obtained above was injection molded onto the core obtained above directly to form the intermediate layer (thickness: 1.0 mm) covering the core. The upper and lower molds for molding the intermediate layer have a semispherical cavity and a pimple wherein a part of the pimple also serves as a retractable hold pin. When forming the intermediate layer, the hold pin was protruded to hold the core, and the intermediate layer composition heated to 260° C. was injected into a mold held under a pressure of 80 tons within 0.3 second and cooled for 30 seconds. Then, the mold was opened.

thickness of 8 μm, were formed respectively, by applying the second paint film paint and the first paint film paint in order. With respect to Golf ball No. 11, the paint was applied one time to form the single-layered paint film having a thickness of 8 μm. The application of the paint was carried out as follows. The golf ball body was placed in a rotating member shown in FIG. 1, and the rotating member was allowed to rotate at 300 rpm. The application of the paint was conducted by spacing a spray distance (7 cm) between the air gun and the golf ball body, and moving the air gun in a up and down direction. Evaluation results of the visibility and the weather resistance of the obtained golf ball are shown in Table 4.

TABLE 4

|  |  | Golf ball No. | | | | | | | | | | |
|---|---|---|---|---|---|---|---|---|---|---|---|
|  |  | 1 | 2 | 3 | 4 | 5 | 6 | 7 | 8 | 9 | 10 | 11 |
| Ball body | Core | I | I | I | I | I | I | I | I | I | I | I |
|  | Intermediate layer | a | b | a | b | a | b | a | b | a | a | a |
|  | Cover | A | B | C | D | A | B | C | D | A | A | A |
| Second paint film layer | Base agent | Polyol 1 | | | | | | | | | | — |
|  | Curing agent | Polyisocyanate 1 | | | | | | | | | | — |
|  | Ultraviolet absorber 1* | 0.8 | 0.8 | 0.8 | 0.8 | 0.8 | 0.8 | 0.8 | 0.8 | — | 0.8 | — |
| First paint film layer | Base agent | Polyol 1 | | | | | | | | | | |
|  | Curing agent | Polyisocyanate 1 | | | | | | | | | | |
|  | Ultraviolet absorber 1* | — | — | — | — | — | — | — | — | — | 0.8 | — |
|  | Inorganic fluorescent agent 1* | 5 | — | 5 | — | 5 | — | 5 | — | 5 | 5 | 5 |
|  | Inorganic fluorescent agent 2* | — | 5 | — | 5 | — | 5 | — | 5 | — | — | — |
|  | Average particle diameter of fluorescent substance | 3 | 3 | 3 | 3 | 7 | 7 | 7 | 7 | 7 | 7 | 7 |
| Evaluation | Weather resistance | E | E | E | E | E | E | E | E | P | E | P |
|  | Visibility | G | G | G | G | E | E | E | E | G | P | G |

*amount (parts by mass) with respect to 100 parts by mass of the base resin constituting the paint film
Polyol 1: a mixture of polyether polyol and polyester polyol (hydroxyl value: 82 mgKOH/g)
Polyisocyanate 1: hexamethylene diisocyanate
Ultraviolet absorber1: TINUVIN 900 manufactured by BASF Corporation
Inorganic fluorescent agent 1: $BaMgAl_{10}O_{17}$:Eu (blue) having a volume average particle diameter of 3 μm or 7 μm
Inorganic fluorescent agent 2: $Y_3Al_5O_{12}$:Ce (yellow) having a volume average particle diameter of 3 μm or 7 μm (4) Molding of Half Shell The obtained cover composition in a pellet form was charged one by one into each concave portion of the lower mold of the molds for molding half shells, and the half shells were molded by performing compression. Compression molding was conducted at a molding temperature of 170° C. for 5 minutes under a molding pressure of 2.94 MPa.

(5) Molding of Cover

The spherical body obtained in (3) was concentrically covered with two of the half shells obtained in (4), and then subjected to compression molding to form the cover (thickness: 0.5 mm). Compression molding was conducted at a molding temperature of 145° C. for 2 minutes under a molding pressure of 9.8 MPa.

(6) Preparation of Paint

The base agent and the curing agent (NCO group/OH group=1.2 (mole ratio)), and where necessary the inorganic fluorescent agent and the ultraviolet absorber, shown in Table 4, were blended to prepare the first paint film layer paint and the second paint film layer paint, respectively.

(7) Formation of Paint Film

The surface of the golf ball body obtained in (5) was treated with sandblast and marked. The paint was applied to the golf ball body with an air gun, and then dried for 60 minutes in an oven at 40° C. to obtain the golf ball having a diameter of 42.7 mm and a mass of 45.4 g. With respect to Golf balls No. 1 to No. 10, the second paint film layer and the first paint film layer (outermost layer), each having a It is noted that the ultraviolet absorber and the inorganic fluorescent agent were blended in the polyol component.

It is apparent from the results shown in Table 4 that, the golf ball according to the present invention, comprising a golf ball body and two or more paint film layers formed on a surface of the golf ball body, wherein the paint film layers comprises a first paint film layer containing an inorganic fluorescent agent but substantially not containing an ultraviolet absorber, and a second paint film layer containing an ultraviolet absorber but substantially not containing an inorganic fluorescent agent; and the second paint film layer is disposed inside the first paint film layer, shows excellent visibility and weather resistance.

The present invention is useful for a painted golf ball. This application is based on Japanese Patent application No. 2014-266654 filed on Dec. 26, 2014, the contents of which are hereby incorporated by reference.

The invention claimed is:

1. A golf ball comprising a golf ball body and two or more paint film layers formed on a surface of the golf ball body, wherein the paint film layers comprises a first paint film layer containing an inorganic fluorescent agent but substantially not containing an ultraviolet absorber, and a second paint film layer containing an ultraviolet absorber but substantially not containing an inorganic fluorescent agent; and the second paint film layer is disposed inside the first paint film layer.

2. The golf ball according to claim 1, wherein the first paint film layer is an outermost paint film layer.

3. The golf ball according to claim 1, wherein the inorganic fluorescent agent is at least one selected from the group consisting of $BaMgAl_{10}O_{17}$:Eu, $(SrCaBaMg)_5(PO_4)_3Cl$:Eu, $Zn_2SiO_4$:Mn, $BaMg_2Al_{16}O_{27}$:Eu, $BaMg_2Al_{16}O_{27}$:Eu/Mn, $LaPO_4$:Ce/Tb, $Y_3Al_5O_{12}$:Ce, $Y_2O_2S$:Eu, $Ca_{10}(PO_4)_6FCl$:Sb/Mn, and $Y_2O_3$:Eu.

4. The golf ball according to claim 1, wherein a content of the inorganic fluorescent agent in the first paint film layer ranges from 1 part by mass to 25 parts by mass with respect to 100 parts by mass of a base resin constituting the first paint film layer.

5. The golf ball according to claim 1, wherein a content of the ultraviolet absorber in the second paint film layer ranges from 0.2 part by mass to 3.5 parts by mass with respect to 100 parts by mass of a base resin constituting the second paint film layer.

6. The golf ball according to claim 1, wherein a base resin constituting the first paint film layer and the second paint film layer includes a polyurethane obtained by a reaction between a polyol component and a polyisocyanate component.

7. The golf ball according to claim 1, wherein the inorganic fluorescent agent has a volume average particle diameter ranging from 3 μm to 10 μm.

8. The golf ball according to claim 1, wherein a content of the inorganic fluorescent agent in the first paint film layer ranges from 3 parts by mass to 23 parts by mass with respect to 100 parts by mass of a base resin constituting the first paint film layer.

9. The golf ball according to claim 1, wherein a content of the ultraviolet absorber in the second paint film layer ranges from 0.5 part by mass to 1.0 part by mass with respect to 100 parts by mass of a base resin constituting the second paint film layer.

10. The golf ball according to claim 1, wherein the ultraviolet absorber is at least one selected from the group consisting of a salicylic acid derivate, a benzophenone derivate, a benzotriazole derivate, a cyanoacrylate derivate, a triazine derivate, and a nickel complex.

11. The golf ball according to claim 6, wherein a content of an isocyanate group (NCO %) in the polyisocyanate component ranges from 0.5 mass % to 45 mass %.

12. The golf ball according to claim 6, wherein the polyol component has a hydroxyl value ranging from 55 mg KOH/g to 100 mg KOH/g.

13. The golf ball according to claim 6, wherein a molar ratio (NCO group/OH group) of an isocyanate group (NCO group) of the polyisocyanate component to a hydroxyl group (OH group) of the polyol component is 1.0 or more.

14. The golf ball according to claim 1, wherein the first paint film layer has a thickness ranging from 5 μm to 15 μm.

15. The golf ball according to claim 1, wherein the second paint film layer has a thickness ranging from 5 μm to 15 μm.

16. The golf ball according to claim 1, wherein the paint film layers have a total thickness ranging from 10 μm to 25 μm.

17. The golf ball according to claim 1, wherein the golf ball body comprises a core and at least one cover layer covering the core, and an outermost cover layer contains a fluorescent dye and/or a fluorescent pigment.

18. The golf ball according to claim 17, wherein the fluorescent dye and/or the fluorescent pigment contained in the outermost cover layer develops a similar color as the inorganic fluorescent agent contained in the first paint film layer.

19. The golf ball according to claim 17, wherein a content of the fluorescent dye and/or the fluorescent pigment in the outermost cover layer ranges from 0.5 part by mass to 3.5 parts by mass with respect to 100 parts by mass of a resin component constituting the outermost cover layer.

* * * * *